United States Patent [19]

Lang et al.

[11] Patent Number: 4,593,718
[45] Date of Patent: Jun. 10, 1986

[54] PRESSURE AGENT CONTROL ARRANGEMENT FOR AUXILIARY POWER STEERING MECHANISMS

[75] Inventors: Armin Lang, Schwabisch Gmund; Helmut Knodler, Lorch, both of Fed. Rep. of Germany

[73] Assignee: Zahnradfabrik Friedrichshafen, AG, Friedrichshafen, Fed. Rep. of Germany

[21] Appl. No.: 713,407

[22] PCT Filed: May 4, 1984

[86] PCT No.: PCT/EP84/00132
§ 371 Date: Mar. 15, 1985
§ 102(e) Date: Mar. 15, 1985

[87] PCT Pub. No.: WO85/00564
PCT Pub. Date: Feb. 14, 1985

[30] Foreign Application Priority Data

Jul. 23, 1983 [LU] Luxembourg ............ 00197

[51] Int. Cl.⁴ .................................... F15B 13/02
[52] U.S. Cl. .................................. 137/596; 91/372; 91/375 A; 91/434; 91/465
[58] Field of Search ............... 91/370, 371, 372, 373, 91/375 A, 434, 465; 137/596; 180/132

[56] References Cited

FOREIGN PATENT DOCUMENTS 1480713 8/1969 Fed. Rep. of Germany ...... 180/132
1924032 11/1970 Fed. Rep. of Germany .
2242346 3/1974 Fed. Rep. of Germany .

*Primary Examiner*—Gerald A. Michalsky
*Attorney, Agent, or Firm*—Zalkind & Shuster

[57] ABSTRACT

A booster steering valve control of the kind that comprises a pair of valve pistons reciprocal in a rotative valve body are driven by a fork shaped member at the end of a steering spindle. The fork shaped member comprises a pair of spaced actuator pins which engage in openings of the respective valve pistons. Thus, the valve body and the fork shaped member have a common axis about which the actuator pins rotate. A particular construction of the invention resides in the displacement of the actuator pins such that their axes are not in a common plane with the steering spindle axis but offset so that the surfaces of engagement between the actuator pins with the respective valve pistons and the spindle axis are coplanar. Engagement is maintained by spring bias acting on the valve pistons. Other construction provides widening the distance between the actuator pins by engaging side grooves of respective valve pistons and providing resilient clamps having a force direction acting on the valve pistons to effect surface engagement between the grooves and respective actuator pins parallel to the reciprocal axes of the valve pistons directly in line with the engaged surfaces.

9 Claims, 2 Drawing Figures

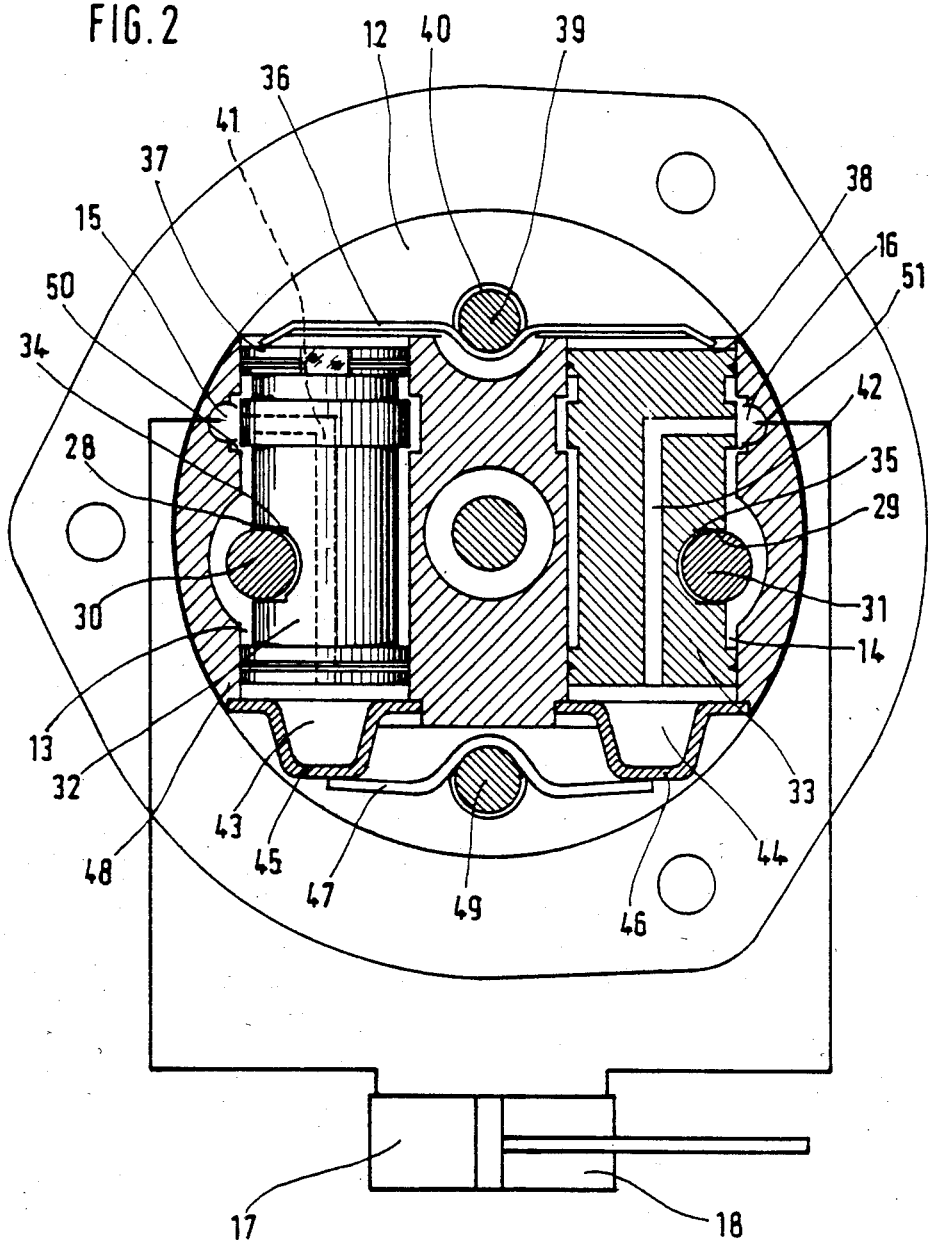

PRESSURE AGENT CONTROL ARRANGEMENT FOR AUXILIARY POWER STEERING MECHANISMS

This invention is cross-referenced to the application of the same inventors, Armin Lang and Helmut Knodler, Ser. No. 713,406, filed Mar. 15, 1985 and owned by the same Assignee.

BACKGROUND OF THE INVENTION

It has heretofor been customary as shown in German Pat. No. 19 24 032 and Counterpart British Pat. No. 1,254,673 to utilize a fork shaped end of a steering spindle comprising valve actuator pins having their axes in a plane with the steering spindle axis. These actuator pins protrude into elongated bores in respective valve pistons snugly without play, sliding normal to the steering spindle. The surface of the actuator pins and the surfaces of respective bores, as the steering spindle is rotated, keeps shifting relative the steering spindle axis due to the fixed path of reciprocation of the piston valves relative to the arcuate motion of the actuator pins. During this point of force shifting the valve pistons have about a 20% traverse. Thus, there is friction between the engaged surfaces. In order to avoid valve hysteresis it is necessary to keep the force needed to reciprocate the piston valves as small as possible.

BRIEF DESCRIPTION OF THE INVENTION

The invention is constructed to minimize friction and play by utilizing a geometry of steering spindle axis and the axes of the actuator pins such that they are not in the same plane. Thus, the latter axes are offset so that the points of force engagement between the surfaces of the valve piston bores and the respective actuator pins are in a plane with the steering spindle axis. This reduces the relative movement between the actuator pins and the valve pistons by a factor of 10. Such relative movement becomes so small that spring means may be utilized to effect motivation to dispense with positive drive in the opposite direction.

Further, the construction is adapted for increasing the lever arm length between the rotating steering spindle and the actuator pins so that for the same angular movement of the steering spindle a greater swing of the actuator pins results in a greater traverse of the valve pistons. This results in a lessening of friction between the actuator pins and the valve pistons since the driving forces are lessened. Such increase in lever arm is effected by providing a semi-bore or groove, open at the outside of each valve piston for the actuator pins.

Additionally, the novel construction has an advantage of permitting tolerance increase in production, as well as effecting an economy of manufacture as compared with providing full bores for the actuator pins.

A detailed desciption of the invention now follows in conjunction with the appended drawing, in which:

FIG. 2 is a second embodiment shown in longitudinal cross section.

Figure 1:
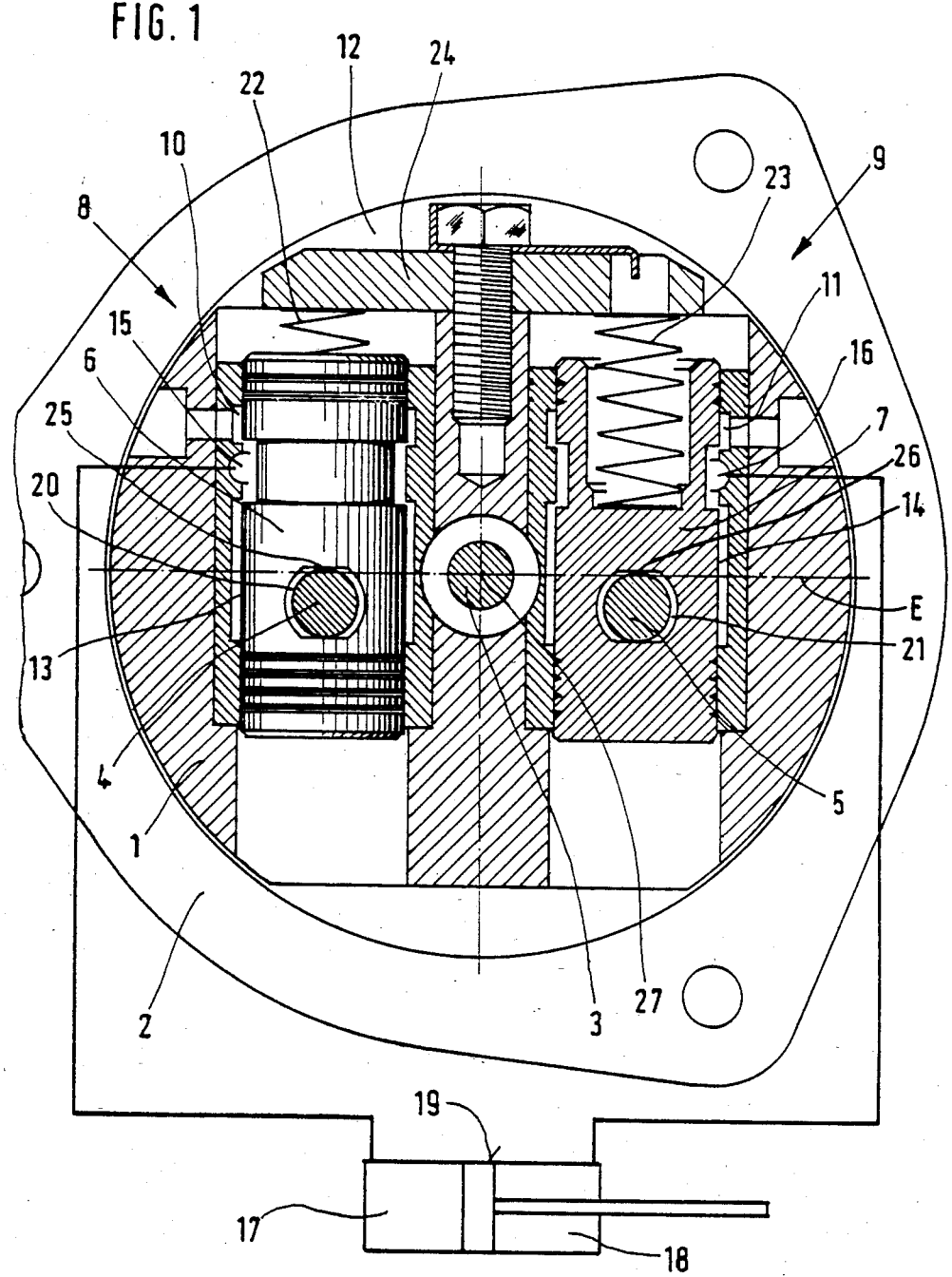
FIG. 1 is an embodiment shown in longitudinal cross section.

Referring to FIG. 1, a valve body 1 is shown which will be understood to be at the terminal of a steering worm (not shown) and which is mounted rotatively in a booster steering housing 2 in a conventional manner. It will be understood that the steering worm connects with a steering spindle (not shown) in a conventional manner resiliently coaxial with a torsion rod 3. It will be further understood that the steering spindle has spaced arms of a fork shaped end which carries actuator pins 4 and 5 to actuate valve pistons 6 and 7 of respective control valves 8 and 9 transversely disposed to the longitudinal axis of the spindle. However, it will be noted that the axes of the pins are nonplanar to the axis of the spindle, although aligned in a symmetrical arrangement therewith, offset eccentrically as shown.

Each control valve 8 and 9 has a respective inlet annular groove 10 and 11 connecting with an inlet chamber 12 in the steering housing. Also, each control valve 8 and 9 has a respective return annular groove 13 and 14 and an annular groove 15 and 16 for connection with a tank (not shown) and for connection with respective pressure chambers 17 and 18 of a servo motor 19.

The valve pistons 6 and 7 are provided with transverse bores 20 and 21 shown to be elongated in directions transversely of the valve pin axes and into which bores the respective actuating pins 4 and 5 extend with side clearance, apparent on FIG. 1, to permit freedom of swinging movement. Valve pistons 6 and 7 are biased by respective compression springs 22 and 23, the outer ends of which have reaction support on a yoke 24 secured to valve body 1. As a result of the bias force there is maintained, as seen, an engagement of surfaces of the bores lying on the lines 25 and 26 with the actuating pins 4 and 5. The reference numerals 25 and 26 indicate engaged surfaces referred to herein as lines of contact.

A comparison may now be readily made with the prior art in connection with FIG. 1, in that, referring to British Pat. No. 1,254,673, FIGS. 2 and 3, the axes of pins 13 and 14 will be seen to be in a common plane with the axes of the valve bodies and steering spindle 1. On the other hand, in the present invention there is clear contrast in the offset or eccentricity of the steering spindle rotational axis 27 and the axes (not numbered) of the actuator pins so that surfaces of contact engagement occurring on lines 25 and 26 are approximately in a plane E with steering spindle axis 27 which plane E is substantially normal to the reciprocal axes (not numbered) of the valve pistons.

Referring now to FIG. 2, the essential difference as compared with FIG. 1 resides in the fact that the distance between lines of contact engagement 28 and 29 of the actuator pins 30 and 31 with the valve pistons 32 and 33 is greater than the distance between axes of the valve pistons 32 and 33, as compared with FIG. 1. It will be noted that the points of surface engagement on contact engagement lines 28 and 29 is adjacent the open sides of the grooves 34 and 35, respectively to effect maximum distance between pins 30 and 31.

This is effected by an increased outward distance of the actuator pins 30 and 31, as clearly disclosed in FIG. 2. There is thus the elimination of expensively produced closed elongated bores in favor of open side grooves 34 and 35 is respective valve pistons 32 and 33, a simpler manufacturing procedure.

Geometrically, the surface engagement is tangential point contact, but it is obvious that in actual construction there is some finite area of engaged surfaces between actuator pins and the valve piston drive bores or side grooves.

In order to prevent tilting moments on the valve pistons in the construction wherein the actuator pins 30 and 31 are disposed beyond the longitudinal axes of respective valve pistons 32 and 33, a tilting which might result from the use of compression springs as in FIG. 1, a spring clamp or leaf 36 is utilized in place of the compression springs 22 and 23 of FIG. 1. Thus, spring clamp 36 is a resilient bar of spring metal which may be characterized as a spring leaf and which also replaces the yoke or bar 24 of FIG. 1. Spring clamp 36 engages along lines of contact engagement 37 and 38 with respective valve pistons 32 and 33, and it will be noted that the directions of force are parallel to the valve piston axes and intersect respective lines of contact 28 and 29 at engaged surfaces between the actuator pins 30 and 31 and respective valve pistons 32 and 33. In this manner, due to the direction of biasing force toward the axis of the actuator pins, there is no force tending to tilt the valve pistons. Spring clamp 36 is secured by a pin 39, and is bent as shown to be accommodated within a recess 40 of the pin to axially retain the pin. Pin 39 may be conveniently socketed in a simple bore (not shown) in the valve body extending on each side of the inlet chamber 12 (FIG. 2) in the valve body, which accommodates the spring clamp.

In addition to the simpler maufacture of the form of the invention shown in FIG. 2, by virtue of the grooves 34 and 35 in the valve pistons 32 and 33 there is also the advantage that for equal angles of movement of the actuator pins with respect to the axis of the valve body the traverse of the respective valve piston is larger. This follows from the fact that the lever arms of a fork shaped end of the steering spindle are necessarily longer and therefore the actuator pins swing on a greater radius. Accordingly, where equal manufacturing precision is realized, steering precision is correspondingly increased.

Further, by disposing the grooves 34 and 35 on the exterior of the respective valve pistons 32 and 33 sufficient space is provided in the valve pistons 32 and 33 for longitudinal channels 41 and 42 through the valve piston bodies, respectively. The longitudinal channels 41 and 42 are connected with annular servomotor grooves 15 and 16, respectively, to transfer pressure to reaction chamber 43 and 44 effective in corresponding pressure chambers 17 and 18 of the servomotor. These chambers are disposed at the ends of respective valve pistons 32 and 33 opposite to the ends engaged by spring clamp 36. Reaction chambers 43 and 44 and limited in axial extent by respective closure caps 45 and 46 secured in position by a clamp 47 in valve body 48 as by a pin 49. The construction is similar to that described above, thus pin 49 is held in valve body 48 in a manner corresponding to pin 39.

The arrangement of the reaction chambers 43 and 44 results in hydraulic pressure forces engaging ends of the valve pistons 32 and 33 which pressure forces are paralleled with the spring forces of clamp 36 on valve pistons 32 and 33. Thus, the lines of contact 28 and 29 between actuator pins 30 and 31 and valve pistons 32 and 33, all respectively, are not disturbed or misaligned by virtue of hydraulic reaction pressures. The pressure agent is fed in by way of inlet chamber 12 and the largest system pressure acts on the same ends of valve pistons 32 and 33 as do the forces of clamp 36. The opposite ends of the valve pistons 32 or 33 depending upon directions of motion are pressure relieved via return grooves 50 and 51 adjoining respective grooves 15 and 16 to return grooves 13 and 14, respectively.

We claim:

1. In a booster steering system valve control for a servomotor, of the kind having actuator pins (4, 5; 30, 31) rotative about an axis 27 and actuably engaging valve pistons (6, 7; 32, 33) in a rotative valve body, reciprocal on respective axes, wherein spring means (22, 23; 36) are carried by said valve body biasing said actuator pins to effect engaged surfaces between said actuator pins and respective valve pistons within openings in respective valve pistons for actuation thereof:

the improvement wherein the engaged surfaces and the axis (27) are disposed approximately in the same plane (E) which is substantially normal to the axes of said valve pistons to minimize frictional resistance by reducing relative movement between said actuator pins and respective valve pistons.

2. In a booster steering system as set forth in claim 1, wherein said actuator pins protrude into openings (20, 21; 34, 35) of respective valve pistons, said openings having side clearance to permit freedom of swinging of said actuator pins.

3. In a booster steering system as set forth in claim 2, wherein the openings are disposed in respective valve pistons so that the distance between engaged surfaces of a pair of valve pistons and their actuator pins is greater than the distance between the axes of said valve pistons.

4. In a booster steering system as set forth in claim 1, wherein the openings are disposed in respective valve pistons so that the distance between engaged surfaces of a pair of valve pistons and their actuator pins is greater than the distance between the axes of said valve pistons.

5. In a booster steering system as set forth in claim 1, wherein said openings comprise open side grooves (34, 35) in respective valve pistons transversely of the axes thereof so that engaged surfaces are adjacent the open sides of said grooves.

6. In a booster steering system as set forth in claim 5, wherein said spring means is disposed to direct a bias force on respective valve pistons toward engaged surfaces and parallel to respective valve piston axes.

7. In a booster steering system as set forth in claim 6, wherein the openings are disposed in respective valve pistons so that the distance between engaged surfaces of a pair of valve pistons and their actuator pins is greater than the distance between the axes of said valve pistons.

8. In a booster steering system as set forth in claim 1, said spring means (36) being at one end of said valve pistons and a respective reaction chamber (43, 44) at the opposite ends thereof; including a passage (42) extending in each valve piston communicating from the respective reaction chamber and outwardly of each said valve piston for communication with a respective servomotor chamber.

9. In a booster steering system as set forth in claim 8, including open side grooves (34, 35) in respective valve pistons transversely of the axes thereof so that engaged surfaces are adjacent the open sides of said grooves.

* * * * *